United States Patent [19]

Kobayashi

[11] Patent Number: 4,685,588
[45] Date of Patent: Aug. 11, 1987

[54] PORTABLE CONTAINER FOR FOOD OR DRINK TO BE WARMED OR COOLED

[76] Inventor: Hiroshige Kobayashi, 6-61, Shibayama, Funabashi City, Chiba Prefecture, Japan

[21] Appl. No.: 882,741

[22] Filed: Jul. 7, 1986

[30] Foreign Application Priority Data

Dec. 6, 1985 [JP] Japan ............................. 60-273389

[51] Int. Cl.⁴ ............................................. F28D 1/06
[52] U.S. Cl. .................................... 220/428; 220/23; 220/408
[58] Field of Search ............... 220/428, 427, 400, 408, 220/411, 412, 23.83, 23.86, DIG. 10, 23

[56] References Cited

U.S. PATENT DOCUMENTS

| | | | |
|---|---|---|---|
| 1,152,308 | 8/1915 | Evans | 220/428 X |
| 1,721,311 | 7/1929 | Muenchen | 220/408 X |
| 2,734,358 | 2/1956 | Himmelfarb | 220/408 X |
| 3,766,975 | 10/1973 | Todd | 220/428 X |

Primary Examiner—Steven M. Pollard
Attorney, Agent, or Firm—Sughrue, Mion, Zinn, Macpeak and Seas

[57] ABSTRACT

Portable container comprising an inner cup to contain food or drink and an outer cup to be filled with heat exchange medium so as to keep food or drink contained in the inner cup warm or cool, or to be warmed or cooled when said cups are engaged with each other. Said inner cup is naturally made of a material having good thermal conductivity at least in the bottom and a part of the circumferential wall thereof, while the outer cup and the remainder part of the inner cup is preferably made of thermally insulating material.

8 Claims, 6 Drawing Figures

PORTABLE CONTAINER FOR FOOD OR DRINK TO BE WARMED OR COOLED

FIELD OF THE INVENTION AND RELATED ART

The present invention relates to a container for food or drink to be warmed or cooled, or kept warm or cool.

Nowadays many varieties of instant baby foods are available. Most of them are pre-cooked digestive porridges or gruels vacuum-packed in a minibottle of a volume just suitable for a baby's meal. With these instant baby foods a parent is required to only heat the minibottle in boiled water or by a microwaver oven before feeding the baby. Because of its convenienc and sanitariness, minibottled baby foods are greatly accepted as a quick meal at home, as well as a take-out meal. However, in the outdoor case, most parents have a problem especially at winter times with the minibottled baby food because of the unavailability of reheating means.

U.S. Pat. No. 4,006,835 shows wide mouth thermos bottles to be suited to storing solid and semi-solid food by providing compound stopper removable engaging the thermos for converting the wide mouth thermos to a narrow mouth configuration. This may be considered to be one solution to the problem, but it apparently fails to meet the above need for the following reason. The instant baby food, as long as it is vacuum-packed in the minibottle, is assured to be stored at room temperature for several months. When it is unpacked, however, it should be stored at a lower temperature for instance in a refregerator rather than at a higher temperature e.g. in the wide thermos bottle. Therefore, most parents prefer to keep the baby food unpacked as long as possible.

Various portable burners for cooking have been used by hikers and mountaineers. It takes time for making arrangements to use such portable burners. Thus, it has been desired to provide more simple device for warming drinks and precooked foods recently readily available.

SUMMARY OF THE INVENTION

It is accordingly an object of the invention to provide a portable device capable of warming or cooling foods or drinks by means of a liquid to be used as heat exchange medium.

It is another object to provide a portable container adapted to be used as a cup mounted on a thermos so that liquid contained therein may be used as said heat exchange medium.

These objects and various advantages to be appreciated by studying the explanation to be given hereafter and are attained according to the invention by providing a portable container comprising an inner cup made of a thermally conductive bottom portion and a thermally insulative body portion to contain food or drink and an outer cup of thermally good insulative material to be filled with a heat exchange medium, said two cups being adapted to be engaged with each other so that said bottom portion may be dipped in said heat exchange medium.

DETAILED EXPLANATION OF PREFERRED EMBODIMENTS

Figure 1:
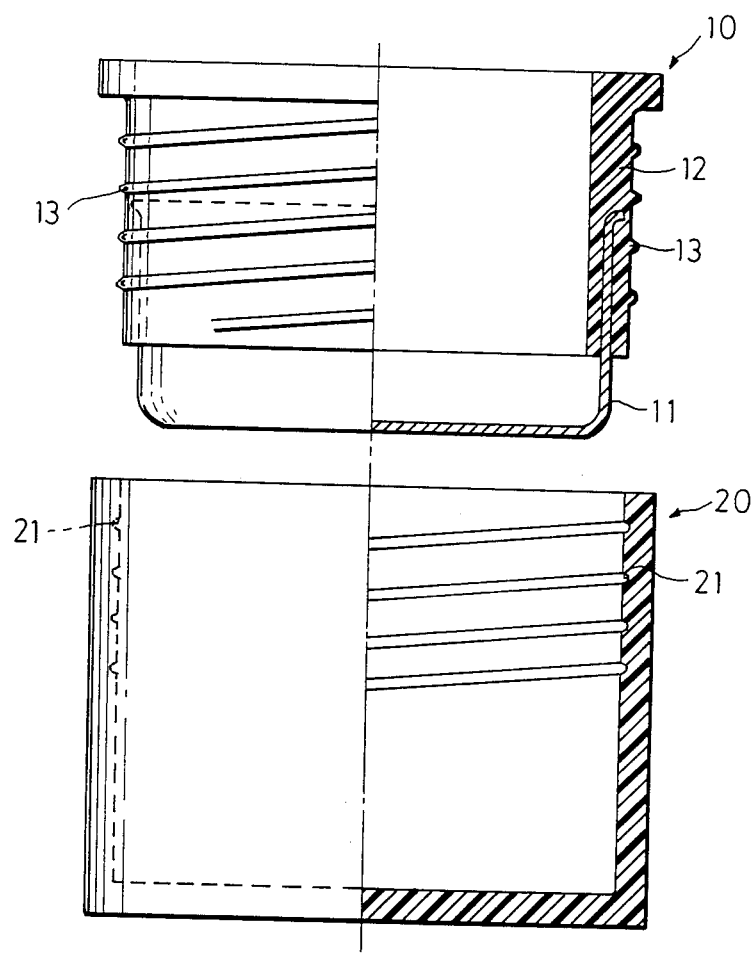
FIG. 1 is a side elevation of an inner and outer cup in the left half and a sectional view thereof in the right half.
Figure 2:
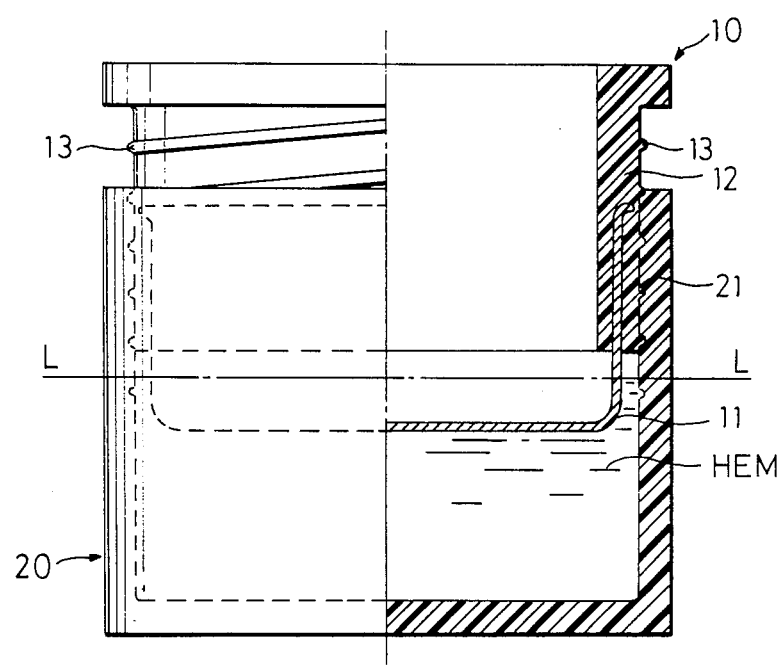
FIG. 2 is the similar view of the both cups in the assembly state.

In FIGS. 1 and 2, the container according to the invention fundamentally comprises an inner cup represented generally by 10 to contain food or drink therein and an outer cup represented generally by 20 to contain a heat exchange medium, which are adapted to be threadedly engaged with each other.

The inner cup 10 comprises a bottom portion 11 made of a thermally good conductive material such as aluminum, stainless steel and the like and an upper peripheral wall portion 12 made of thermally good insulating material such as some thermoplastic materials sanitarily harmless, which is externally threaded 13 around the peripheral wall thereof for engagement with the outer cup 20. This is made also of a thermally good insulating material such as some thermoplastic materials sanitarily harmless and preferably transparent, which is internally threaded 21 around the peripheral wall thereof to be engaged with said external threads 13 as shown in FIG. 2. This provides a liquid tightly sealed space between said two cups.

The heat exchange medium HEM, for instance hot water is poured into said cup 20 with watching the level L—L thereof through the transparent peripheral wall or a transparent portion thereof not to be excessively but to be sufficiently high so that the thermally conductive bottom portion 11 may relevantly be dipped in said medium HEM.

The inner cup 10 is threadedly engaged with the outer cup 20 until the lower end of the thermally insulative peripheral wall 12 thereof reaches the relevent level L—L.

The food or drink taken in the inner or upper cup 10 it is warmed through the bottom portion by the medium HEM until the temperature equilibrium is attained. When the medium HEM is for instance ice and water, the content in the inner cup 10 is cooled. When a lid is engaged so as to cover the open end of said inner cup, the content therein may be kept warm or cool.

Figure 3:
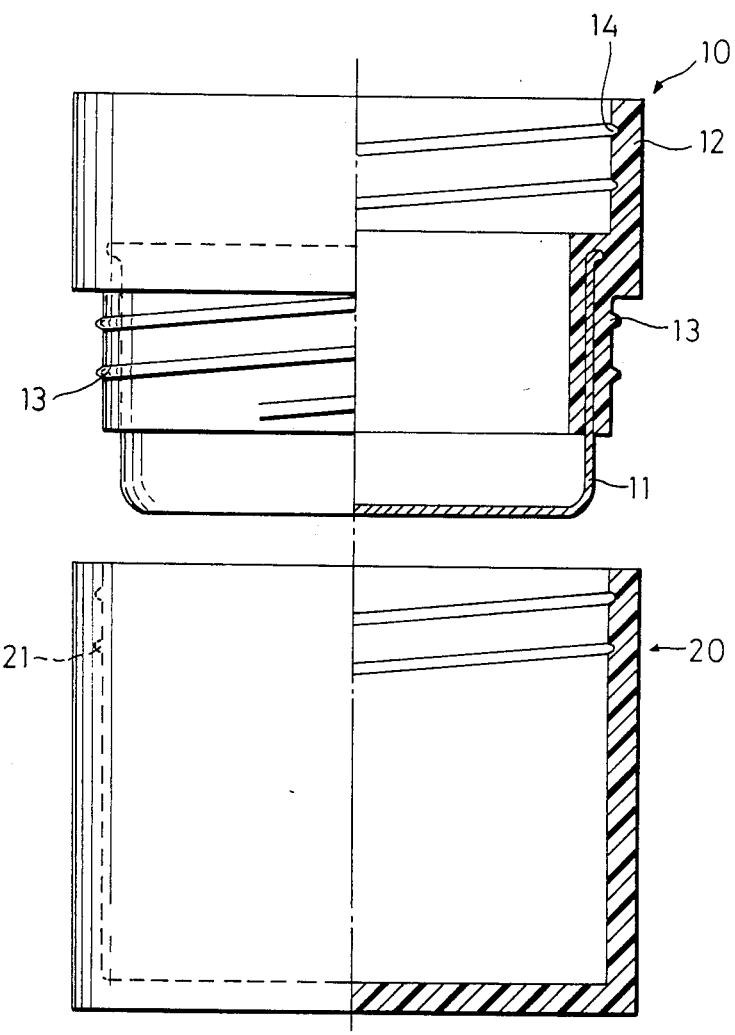
FIG. 3 is a view similar to FIG. 1 but of a modified embodiment.

In FIG. 3, the inner and outer cups 10, 20 are similar to those in FIG. 1 but differ only in that the inner cup 10 is internally threaded 14 so as to be engaged with the external threads around the neck of the popular thermos available in the usual shops.

Figure 4:
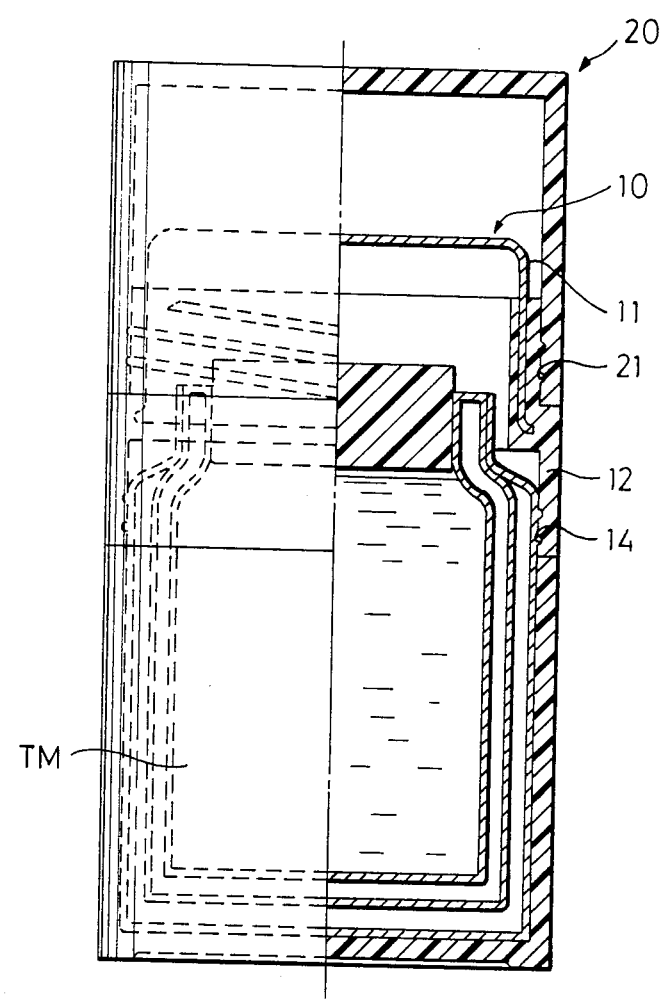
FIG. 4 is the similar view of the assembled two cups engaged, in the inverted position, with a popularly available thermos bottle which itself is not a direct subject of the invention.

In FIG. 4, the assembled cups 10, 20 are threadedly engaged in the reverse position with such thermos TM. Alternatively the cup for the marketed thermos may be used as the outer cup 20 of the invention.

Hot water or ice and water contained in the thermos TM may be poured into the outer cup 20 as referred to in the above. Hot or cold coffee or other beverage may be used as the heat exchange medium HEM.

The inner cup 10 may be used also as the second cup for taking the beverage contained in the thermos TM.

It is possible to form the peripheral wall of the body portion 12 flat over the height thereof and extend internal threads 21 down close to the bottom of the outer cup 20 so that the inner cup 10 engaged with the outer cup 20 is completely received therein, whereby the remainder portion of the internal threads 21 may directly engage with the external threads of the thermos TM.

Figure 5:
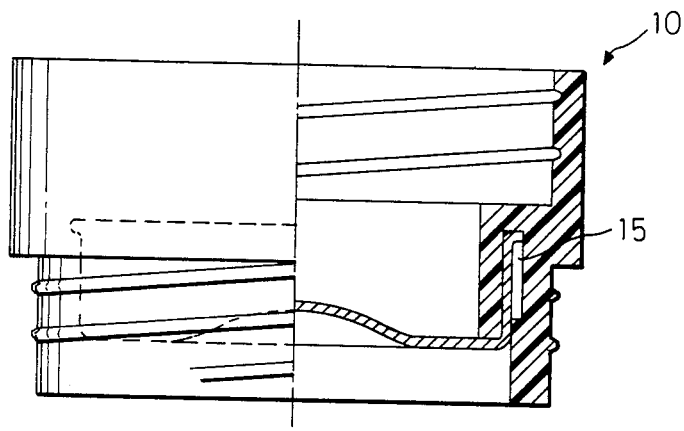
FIG. 5 is a view similar to FIG. 1 but of an inner cup only of a further modified embodiment.
Figure 6:
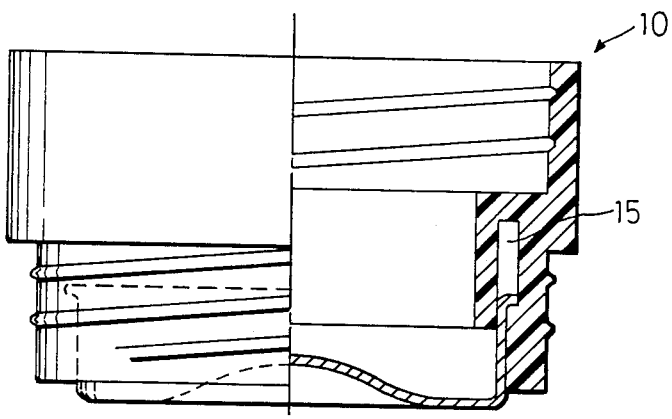
FIG. 6 is the similar view of the above, in which the bottom portion is lowered relative to the body portion of the inner cup.

In FIGS. 5 and 6, there is illustrated a further modified embodiment in which the bottom portion 11 of the inner cup 10 is adjustingly lowered down or raised up relative to the body portion 12.

This is different from the embodiment of the inner cup 10 illustrated in FIG. 3 where the upper peripheral wall of the bottom portion 11 is embedded in the lower peripheral wall of the body portion 12 so as to form one integrated cup 10. Here an annular groove 15 is provided in the peripheral wall 12 so that the upper peripheral wall of the bottom portion may be moved up and down in the range of the height of the groove 15. In order to prevent the circumferential edge of the bottom portion 11 from slipping out of said groove, the edge is preferably bent.

As referred to above, it is farily delicate how far the heat exchange medium is poured into the outer cup 20 and how far the inner cup 10 is threaded in the outer cup 20. The vertical adjustment of the bottom portion 11 relative to the body portion 12 may be helpful so as to reduce said difficulty.

Furthermore, the embodiment of FIGS. 5 and 6 has a bottom wall convex towards the center so that the contact area with the heat exchange medium is extended which is useful more or less for improving the heat exchange efficiency.

What is claimed is:

1. A portable container comprising;
    an inner cup having a thermally conductive bottom portion to contain food or drink therein, and an outer cup of thermally insulative material to be filled with a heat exchange medium, said two cups being adapted to be engaged with each other so that said bottom portion of said inner cup may be dipped in said exchange medium;
    said inner cup has external threads and said outer cup has internal threads so that said outer cup threadedly engaged with said inner cup to completely receive said inner cup therein may engage with the external threads of said thermos with a remainder portion of said internal threads, and
    the assembly of the engaged inner and outer cups are engaged with a thermos in the inverse position.

2. A portable container as set forth in claim 1, in which said inner and outer cups are interlocked with each other so that said heat exchange medium is sealed tightly in-between the two cups.

3. A portable container as set forth in claim 1, in which said inner and outer cups are threadedly engageable so that the depth of said bottom portion dipping in said heat exchange medium may be adjusted depending on how far said inner cup is threaded into said outer cup.

4. A portable container as set forth in claim 3, in which said outer cup is consist of transparent material, such as plastics, through which the adjustment of the dipping of said bottom portion of said inner cup into said heat exchange medium is visually controlled.

5. A portable container as set forth in claim 3, in which the peripheral wall of said body portion of the inner cup is formed with an annular groove so that the upper peripheral wall of said bottom portion may be received in said groove for adjustingly raising or lowering said bottom portion relative to said body portion in the range of the height of said groove.

6. A portable container as set forth in claim 1, in which said inner cup has internal and external threads around the peripheral wall thereof so as to threadedly engage with said outer cup having internal threads around the peripheral wall and threadedly engage with the external threads formed at the neck of said thermos.

7. A portable container as set forth in said claim 1, in which said inner cup has a curved bottom wall.

8. A portable container as set forth in said claim 7, in which said bottom wall is convex towards the center thereof.

* * * * *